United States Patent
Wang et al.

(10) Patent No.: US 9,510,273 B2
(45) Date of Patent: Nov. 29, 2016

(54) COMMUNICATION SYSTEM WITH CELL SELECTION MECHANISM AND METHOD OF OPERATION THEREOF

(71) Applicant: Samsung Electronics Co., Ltd., Suwon-si, Gyeonggi-Do (KR)

(72) Inventors: Fan Wang, Sunnyvale, CA (US); Kee-Bong Song, San Diego, CA (US); Seongho Hur, Suwon-Si (KR); Jeong Heon Lee, Sungnam-Si (KR); KiHyun Do, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 19 days.

(21) Appl. No.: 14/187,864

(22) Filed: Feb. 24, 2014

(65) Prior Publication Data
US 2015/0080043 A1     Mar. 19, 2015

Related U.S. Application Data

(60) Provisional application No. 61/879,609, filed on Sep. 18, 2013.

(51) Int. Cl.
*H04B 7/00*     (2006.01)
*H04W 48/16*    (2009.01)
*H04W 48/20*    (2009.01)

(52) U.S. Cl.
CPC ............. *H04W 48/16* (2013.01); *H04W 48/20* (2013.01)

(58) Field of Classification Search
CPC ........... H04W 36/20; H04W 36/0083; H04W 36/30; H04W 36/08; H04W 16/14; H04W 36/22; H04W 24/10; H04W 36/06; H04W 36/32; H04W 36/0094; H04W 72/082; H04W 88/08; H04W 36/0055; H04W 36/04; H04W 36/36; H04W 48/20; H04W 36/14
See application file for complete search history.

(56) References Cited

U.S. PATENT DOCUMENTS

| | | | |
|---|---|---|---|
| 5,940,761 A * | 8/1999 | Tiedemann et al. | 455/437 |
| 2008/0220784 A1* | 9/2008 | Somasundaram | H04W 36/0083 455/437 |
| 2009/0023466 A1 | 1/2009 | Sutivong et al. | |
| 2009/0092059 A1 | 4/2009 | Fu | |
| 2009/0190500 A1* | 7/2009 | Ji et al. | 370/254 |
| 2009/0291688 A1* | 11/2009 | Uehara et al. | 455/436 |
| 2011/0032908 A1* | 2/2011 | Lindoff | H04B 17/0077 370/332 |

(Continued)

FOREIGN PATENT DOCUMENTS

EP     1453341 B1     7/2009

OTHER PUBLICATIONS

"3rd generation partnership project; technical specification group radio access network; user equipment (UE) procedures in idle mode and procedures for cell reselection in connected mode (release 7)", 3GPP TS 25.304, v 7.1.0 (Dec. 2006), http://www.qtc.jp/3GPP/Specs/25304-710.pdf.

(Continued)

*Primary Examiner* — Golam Sorowar
(74) *Attorney, Agent, or Firm* — IP Investment Law Group

(57) ABSTRACT

A communication system includes: an antenna configured to receive a receiver signal; a communication unit, coupled to the antenna, configured to: generate a power analysis result including a signal-interference measure based on the receiver signal; and select a transmission frequency based on the signal-interference measure for communicating through a device.

17 Claims, 4 Drawing Sheets

(56) References Cited

U.S. PATENT DOCUMENTS

2012/0295610 A1* 11/2012 Deng .................... H04W 24/10
                                                            455/423
2013/0063083 A1   3/2013 Park et al.
2013/0225194 A1   8/2013 Sung et al.
2014/0378134 A1* 12/2014 Nakamori ......... H04W 36/0083
                                                            455/436

OTHER PUBLICATIONS

3rd generation partnership project; technical specification group radio access network; requirements for support of radio resource management (FDD) (release 1999), 3GPP TS 25.133 v3.22.0 (Sep. 2005), http://www.arib.or.jp/english/html/overview/doc/STD-T63V9_21/5_Appendix/R99/25/25133-3m0.pdf.

* cited by examiner

COMMUNICATION SYSTEM WITH CELL SELECTION MECHANISM AND METHOD OF OPERATION THEREOF

CROSS-REFERENCE TO RELATED APPLICATION(S)

This application claims the benefit of U.S. Provisional Patent Application Ser. No. 61/879,609 filed Sep. 18, 2013, and the subject matter thereof is incorporated herein by reference thereto.

TECHNICAL FIELD

An embodiment of the present invention relates generally to a communication system, and more particularly to a system with cell selection mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a communication system with cell selection mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a communication system, including: an antenna configured to receive a receiver signal; a communication unit, coupled to the antenna, configured to: generate a power analysis result including a signal-interference measure based on the receiver signal; and select a transmission frequency based on the signal-interference measure for communicating through a device.

An embodiment of the present invention provides a method of operation of a communication system including: receiving a receiver signal; generating a power analysis result including a signal-interference measure based on the receiver signal; and selecting the transmission frequency with a communication unit based on the signal-interference measure for communicating through a device.

An embodiment of the present invention provides a non-transitory computer readable medium including instructions for operating a communication system including: receiving a receiver signal; generating a power analysis result including a signal-interference measure based on the receiver signal; and selecting the transmission frequency with a communication unit based on the signal-interference measure for communicating through a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
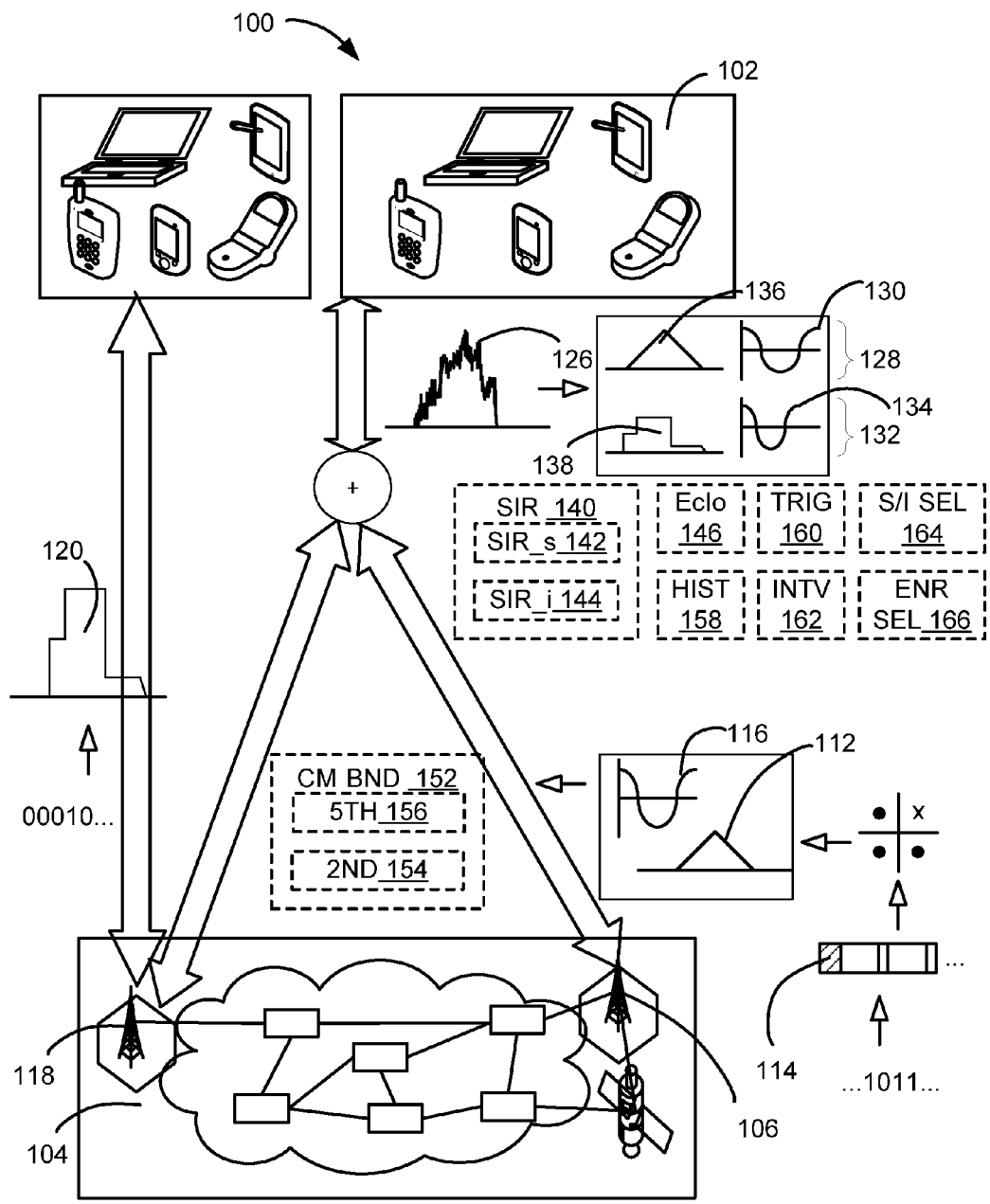
FIG. 1 is a communication system with cell selection mechanism in an embodiment of the present invention.

The following embodiments of the present invention can use a signal-interference measure to reselect a serving frequency. A signal-interference selection mechanism can control selection or reselection of the serving frequency based on the signal-interference measure instead of an energy measure for evaluating or comparing a quality or a characteristic for the serving frequency and one or more instance of a neighbor frequency. A serving ranking and a neighbor ranking can be further calculated for evaluating or comparing the quality or the characteristic for the serving frequency and one or more instance of the neighbor frequency.

Initiating the selection or the reselection process based on the signal-interference measure provides improved reliability. The serving ranking and the neighbor ranking also provides improved throughput and increased efficiency.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a communication system 100 with cell selection mechanism in an embodiment of the present invention. The communication system 100 includes a first device 102, such as a mobile device including a cellular phone or a notebook computer, connected to a network 104. The network 104 is a system of wired or wireless communication devices or means that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The communication system 100 can include a second device 106 for directly or indirectly linking and communicating with the first device 102. The network 104 can include the second device 106. The second device 106 can receive wireless signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can be a base station, can be included or with a cell tower, a wireless router, an antenna, a processing device, or a combination thereof being used to send signals to or receive signals from the first device 102, such as a smart phone or a laptop computer.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a pilot portion, a header portion, a format portion, an error correction or detection portion, or a combination thereof imbedded in the communicated information. The pilot portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The second device 106, such as a base station or an antenna structure, can correspond to a cell site. The cell site can include a representation of a geographical area served by the second device 106. The cell site can include geographic locations where another device, including the first device 102, can communicate with the second device 106. The cell site can be based on a measure of a communication signal, such as for strength or quality, meeting or exceeding a standard at included locations. The second device 106 can correspond to a servicing cell when the second device 106 is communicating with a mobile device, such as the first device 102.

The second device 106 can communicate communication content by sending a transmitter signal 112 to the first device 102. The communication content can include data from a transmitting device intended for communication by reproduction or processing at a receiving device. For example, the communication content can be a sequence of bits intended for displaying, audibly recreating, executing instructions, storing, or a combination thereof at a receiving device, such as the first device 102.

The second device 106 can modify the communication content to generate and transmit the transmitter signal 112. The transmitter signal 112 is data actually transmitted by a device for communication and having a format for transmission.

The second device 106 can generate the transmitter signal 112 by modifying, such as by interleaving or adding formatting information, the communication content according to methods or standardizations predetermined by the communication system 100 to generate a code word. The second device 106 can generate the transmitter signal 112 using one or more symbols according to a modulation scheme, such as quadrature amplitude modulation (QAM) or phase-shift keying (PSK), corresponding to the sequence of bits.

The transmitter signal 112 can further include a pilot portion 114. The pilot portion 114 is a known signal transmitted by a device that is used to determine various types of information at a receiving device. The pilot portion 114 can include a bit, a symbol, a signal pattern, a signal strength, frequency, phase, duration, or a combination thereof predetermined by the communication system 100, a standard, or a combination thereof. The details of the pilot portion 114 can be known and used by one or all devices in the communication system 100.

The pilot portion 114 can include generic information, cell-specific information, or a combination thereof. The pilot portion 114 can further include information regarding a transmission format. The detail, the structure, the content, or a combination thereof for the pilot portion 114 can be used by the receiving device, such as the first device 102, to determine information regarding a mechanism used to transmit data.

The transmitter signal 112 can be communicated using a transmission frequency 116. The transmission frequency 116 can include an oscillation rate for communicating wireless data or information. The transmission frequency 116 can be based on a frequency band including a continuum or a set of frequencies including the transmission frequency 116.

The communication system 100 can include a neighbor source 118 communicating a neighbor signal 120. The neighbor source 118 can include any source generating signals unintended for a specific receiver. For example, the neighbor source 118 can include various transmitters, including a base station or a satellite dish, another mobile communication device, such as a smart phone or a laptop computer, broadcasting station, such as for television or radio, or a combination thereof. The neighbor source 118 can correspond to a neighbor cell as an instance of the cell site different from the serving cell.

The neighbor signal 120 can include data unintended for communication at the receiving device. The neighbor signal 120 can include data or information similar to the communication content as described above, but intended for communication with a different device and received by the first device 102 or for a purpose not currently utilized by the first device 102. The neighbor signal 120 can include the pilot portion 114 corresponding to the neighbor source 118.

For illustrative purposes, the neighbor signal 120 is described as originating from the neighbor source 118. However, it is understood that the neighbor signal 120 can be originated from the second device 106 using a transmission band or a specific frequency therein different than the transmitter signal 112.

The communication system 100 can include a receiver signal 126 for communicating the communication content between devices. For example, the first device 102 can receive the receiver signal 126 as data or information identified or determined by the first device 102 for communication.

The first device 102 can receive the receiver signal 126 including information or data from various sources. For example, the receiver signal 126 can include a serving portion 128 based on a serving frequency 130, a neighbor portion 132 based on a neighbor frequency 134, or a combination thereof. Also for example, the receiver signal 126 can include information or data corresponding to the communication content, the neighbor signal 120, or a combination thereof.

The serving portion 128 is a part of the receiver signal 126 corresponding to the communication content. For example, the serving portion 128 can correspond to data or information transmitted by the second device 106, such as the transmitter signal 112. The serving portion 128 can be based on the transmission frequency 116 or the pilot portion 114 unique to a corresponding device for the communication. The serving frequency 130 is the transmission frequency 116 used for communicating the serving portion 128. The serving frequency 130 can include the transmission frequency 116 utilized by the second device 106.

The communicating devices, such as for the first device 102 and the second device 106, can select and identify the serving frequency 130. The communication system 100 can select and identify the serving frequency 130 between devices using a method or a sequence of interactions pre-determined by the communication system 100 or a communication standard. The communication system 100 can further reselect or change the serving frequency 130 based on a quality or a characteristic of the serving portion 128 prior to the reselection or the change.

The serving portion 128 can include or correspond to a serving power 136. The serving power 136 is a measurement of a power on a particular physical communication channel corresponding to the serving portion 128 or the transmitter signal 112. The serving power 136 can represent signal strength for the transmitter signal 112, a particular spreading code, or a combination thereof. The serving power 136 can include a received signal code power (RSCP) for the transmitter signal 112.

The neighbor portion 132 is a part of the receiver signal 126 corresponding to the information unintended for the receiver device. For example, the neighbor portion 132 can correspond to data or information transmitted by the neighbor source 118, such as the neighbor signal 120. Also for example, the neighbor portion 132 can correspond to data or information transmitted by the second device 106 using a frequency or a pilot portion unintended for communicating with the first device 102. The neighbor portion 132 can be interference to the serving portion 128. The neighbor frequency 134 is the transmission frequency 116 used for communicating the neighbor portion 132.

The neighbor portion 132 can include or correspond to a neighbor power 138. The neighbor power 138 is a measurement of a power on a particular physical communication channel corresponding to the neighbor portion 132 or the neighbor signal 120. The neighbor power 138 can include a RSCP for the neighbor signal 120. The neighbor power 138 can be similar to the serving power 136 but for the neighbor portion 132 or the neighbor signal 120 instead of the transmitter signal 112 or the serving portion 128.

The receiver signal 126 can be received by a device after traversing a transmitter channel, a neighbor channel, or a combination thereof. The communication system 100 can measure the serving power 136, the neighbor power 138, or a combination thereof. The transmitter channel, the neighbor channel, or a combination thereof can be wireless, wired, or a combination thereof.

The transmitter channel, the neighbor channel, or a combination thereof can include a direct link between devices, such as the first device 102 and the second device 106, or can include repeaters, amplifiers, or a combination thereof therebetween for an indirect link. For example, the transmitter channel can include communication frequency, time slot, packet designation, transmission rate, channel code, or a combination thereof used for transmitting signals between the first device 102 and the second device 106. The communication system 100 can estimate the transmitter channel, the neighbor channel, or a combination thereof for further processing of the receiver signal 126.

The communication system 100 can calculate a signal-interference measure 140 based on the receiver signal 126. The signal-interference measure 140 is a representation of a relationship between portions within received signal or data for all channels. The signal-interference measure 140 can represent a quotient or a ratio between portions within the receiver signal 126. The signal-interference measure 140 can be a comparison between a total power measurement for all channels of the serving cell and all channels of one or more instances of the neighbor cell.

For example, the signal-interference measure 140 can be based on the serving portion 128, the neighbor portion 132, or a combination thereof. Also for example, the signal-interference measure 140 can be based on a desired portion and an undesirable portion, such as including an interference signal or noise, within the receiver signal 126.

As a more specific example, the signal-interference measure 140 can be based on the overall power of multiple or all detectible instances of signal channels for the second device 106 and the overall power of multiple or all detectible instances of signal channels of multiple or all detectible instances of the neighbor signal 120. Also as a more specific for example, the signal-interference measure 140 can include a signal-to-interference ratio (SIR), a signal-to-interference-plus-noise ratio (SINR), or a combination thereof.

The signal-interference measure 140 can include a serving measure 142, a neighbor measure 144, or a combination thereof. The serving measure 142 is the signal-interference measure 140 corresponding to the serving portion 128. The serving measure 142 can be based on data corresponding to the pilot portion 114 of the transmitter signal 112, the pilot portion 114 of the neighbor signal 120, interference signal, noise, or a combination thereof.

The neighbor measure 144 is the signal-interference measure 140 corresponding to information other than the serving portion 128. The neighbor measure 144 can correspond to the neighbor portion 132. The neighbor measure 144 can be similar to the serving measure 142 but for the neighbor portion 132.

The communication system 100 can further determine an energy measure 146 based on the receiver signal 126. The energy measure 146 is a representation of a signal quality describing a relationship between portions within received signal or data for CDMA and Universal Mobile Telecommunications System (UMTS).

The energy measure 146 can be similar to the signal-interference measure 140 but specific for a common pilot channel (CPICH) instead of the total overall power. For example, the communication system 100 can calculate the energy measure 146 using one or more portions in the receiver signal 126 corresponding to one or more instances of the pilot portion 114. The energy measure 146 can further represent a relationship, such as a ratio, between power in the pilot portion 114 and the overall power.

The energy measure 146 can include an energy for chip, represented as 'Ec', an interference, represented as 'Io', noise, represented as 'No', a relationship there-between, or a combination thereof. The energy measure 146 can be a ratio between the chip energy and the interference, and can be represented as 'EcIo' or 'Ec/Io'. The energy measure 146 can be calculated based on $$\frac{E_c}{I_o + N_o},$$

The communication system 100 can include a communication band-set 152. The communication band-set 152 is a collection of radio frequencies usable for communication. The communication band-set 152 can include a set of possible values for the transmission frequency 116. The communication band-set 152 can be based on a communication standard, such as for 3GPP or 4G LTE.

For example, the communication band-set 152 can include a second band 154, a fifth band 156, other bands, or a combination thereof. The second band 154 can include a specific frequency band. The second band 154 can be identified as '1900' for representing a range between 1850 MHz and 1910 MHz for uploading from a user equipment (UE) and a range 1930 MHz and 1990 MHz for downloading. The fifth band 156 can include a specific frequency band different from the second band 154. The fifth band 156 can be identified as '850' for representing a range between 824 MHz and 849 MHz for uploading, and for representing a different range between 869 MHz and 894 MHz for downloading.

The communication system 100 can use the communication band-set 152 to select the transmission frequency 116. For example, the communication system 100 can select the second band 154 or the fifth band 156 for communicating between the first device 102 and the second device 106. The communication system 100 can select a value or a set of values, such as for uploading and downloading, for the transmission frequency from within the selected instance of the second band 154 or the fifth band 156.

The communication system 100 can include an analysis history 158. The analysis history 158 is a record of previously occurring processing results. The analysis history 158 can be specific to a region, such as for one or more instances of the cell site. The analysis history 158 can be specific to a device or a combination of devices, such as for the first device 102, the second device 106, or a combination thereof. The analysis history 158 can be specific for a set of conditions, such as time or a number of users.

The analysis history 158 can include one or more prior results as calculation results from prior communications. For example, the analysis history 158 can include prior instances of the signal-interference measure 140, the transmission frequency 116, a derivation thereof, or a combination thereof, corresponding to the serving portion 128, the neighbor portion 132, or a combination thereof. Also for example, the analysis history 158 can include prior instances of the receiver signal 126, the pilot portion 114 therein corresponding to one or more independent sources, a derivation thereof, or a combination thereof.

The communication system 100 can utilize a triggering mechanism 160 for determining or selecting a counterpart device for communication, the cell site, the transmission band, the transmission frequency 116 therein, or a combination thereof. The triggering mechanism 160 is a method or a process for initiating a separate method or a separate process for determining or selecting the counterpart device for communication, the cell site, the transmission band, the transmission frequency 116 therein, or a combination thereof.

The triggering mechanism 160 can include the process or the method implemented using an instruction, a hardware circuitry, such as gates or adders, a firmware setting, or a combination thereof for initiating the separate method or the separate process implemented using a different instruction, a different hardware circuitry, a different firmware setting, or a combination thereof for selecting the transmission frequency 116. The triggering mechanism 160 can further initiate a specific instance of a frequency-selection mechanism from a collection of different mechanisms for selecting the counterpart device for communication, the cell site, the transmission band, the transmission frequency 116 therein, or a combination thereof.

The communication system 100 can utilize the triggering mechanism 160 to initiate a process for selecting the counterpart device for communication, the cell site, the transmission band, the transmission frequency 116 therein, or a combination thereof in various ways. For example, the communication system 100 can utilize the triggering mechanism 160 without a regular interval 162. Also for example, the communication system 100 can utilize the triggering mechanism 160 to initiate a signal-interference selection mechanism 164, an energy selection mechanism 166, or a combination thereof.

The regular interval 162 can include a mandatory buffer or delay before initiating a mechanism for selecting the transmission frequency 116. The communication system 100 can utilize the triggering mechanism 160 to determine a set of conditions for initiating the selection of the transmission frequency 116. The communication system 100 can initiate the selection immediately without the regular interval 162 based on satisfying a condition, a rule, or a combination thereof as determined by the triggering mechanism 160.

The signal-interference selection mechanism 164 is a method or a process for selecting the counterpart device for communication, the cell site, the transmission band, the transmission frequency 116 therein, or a combination thereof utilizing the signal-interference measure 140. The signal-interference selection mechanism 164 can be implemented using an instruction, a hardware circuitry, such as gates or adders, a firmware setting, or a combination thereof for selecting the counterpart device for communication, the cell site, the transmission band, the transmission frequency 116 therein, or a combination thereof utilizing the signal-interference measure 140.

The signal-interference selection mechanism 164 can utilize the serving measure 142, the neighbor measure 144, or a combination thereof to select the counterpart device for communication, the cell site, the transmission band, the transmission frequency 116 therein, or a combination thereof. Details regarding the signal-interference selection mechanism 164 will be described below.

The energy selection mechanism 166 is a method or a process for selecting the counterpart device for communication, the cell site, the transmission band, the transmission frequency 116 therein, or a combination thereof utilizing the energy measure 146. The energy selection mechanism 166 can be similar to the signal-interference selection mechanism 164.

The energy selection mechanism 166 can be implemented using an instruction, a hardware circuitry, such as gates or adders, a firmware setting, or a combination thereof. The energy selection mechanism 166 can utilize the energy measure 146, the regular interval 162, or a combination thereof to select the counterpart device for communication, the cell site, the transmission band, the transmission frequency 116 therein, or a combination thereof.

For illustrative purposes, the communication system 100 is described as the second device 106 transmitting information and the first device 102 receiving the transmitted information. However, it is understood that the communication system 100 can have the second device 106 as the receiving device and the first device 102 as the transmitting device.

For further illustrative purposes, the communication system 100 is described as including one instance of the neighbor source 118 and with the neighbor signal 120 from the neighbor source 118. However, it is understood that the communication system 100 can include multiple instances of the neighbor source 118, neighbor signal 120 from the second device 106, or a combination thereof.

Figure 2:
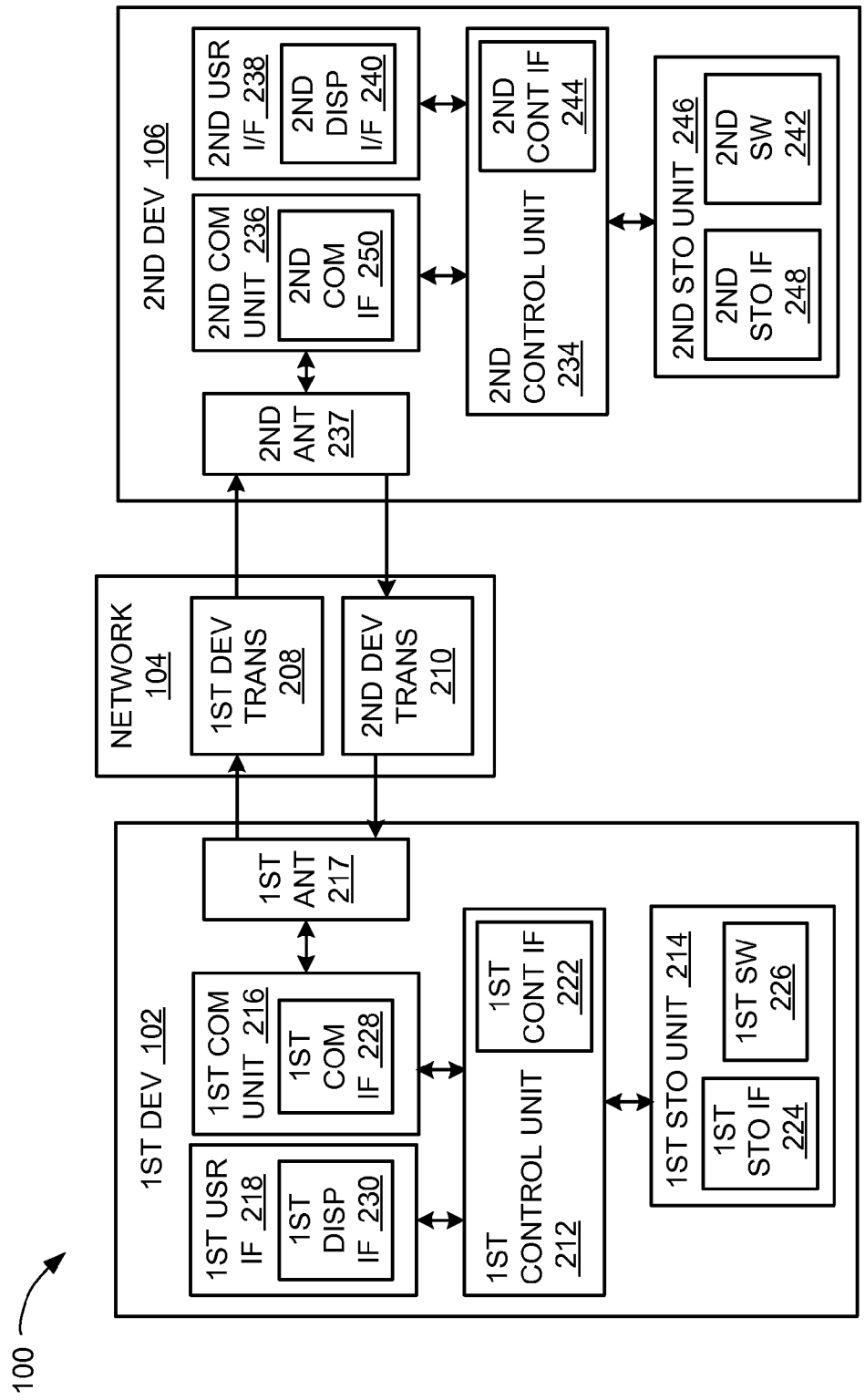
FIG. 2 is an exemplary block diagram of the communication system.

Referring now to FIG. 2, therein is shown an exemplary block diagram of the communication system 100. The communication system 100 can include the first device 102, the network 104, and the second device 106. The first device 102 can send information in a first device transmission 208 over the network 104 to the second device 106. The second device 106 can send information in a second device transmission 210 over the network 104 to the first device 102.

For illustrative purposes, the communication system 100 is shown with the first device 102 as a client device, although it is understood that the communication system 100 can have the first device 102 as a different type of device. For example, the first device 102 can be a server having a display interface.

Also for illustrative purposes, the communication system 100 is shown with the second device 106 as a server, although it is understood that the communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the communication system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106, a different device, an attachment, such as a peripheral device or a desktop computer, the network 104, or a combination thereof.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first antenna 217. The first antenna 217 can be a device or a portion of a device for physically communicating signals. The first antenna 217 can communicate by transmitting or receiving signals to or from another device. The first antenna 217 can be for wireless signals. The first antenna 217 can include an omnidirectional antenna, a wire, an antenna chip, a ceramic antenna, or a combination thereof.

The first antenna 217 can detect or respond to a power in electromagnetic waves and provide the detected result to the first communication unit 216 to receive a signal, including the second device transmission 210. The first antenna 217 can provide a path or respond to currents or voltages provided by the first communication unit 216 to transmit a signal, including the first device transmission 208.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216.

The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control unit 212 can operate the first user interface 218 to display information generated by the communication system 100. The first control unit 212 can also execute the first software 226 for the other functions of the communication system 100. The first control unit 212 can further execute the first software 226 for interaction with the network 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, a second user interface 238, and a second storage unit 246.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the communication system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the communication system 100, including operating the second communication unit 236 to communicate with the first device 102 over the network 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the communication system 100 is shown with the second storage unit 246 as a single hierarchy storage system, although it is understood that the communication system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or resistors, for interaction with the network 104.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 236 can further include one or more portions for storing information, such as cache or RAM memory, registers, or a combination thereof.

The second communication unit 236 can be coupled with a second antenna 237. The second antenna 237 can be a device or a portion of a device for physically communicating signals. The second antenna 237 can communicate by transmitting or receiving signals to or from another device. The second antenna 237 can be for wireless signals. The second antenna 237 can include an omnidirectional antenna, a wire, an antenna chip, a ceramic antenna, or a combination thereof.

The second antenna 237 can detect or respond to a power in electromagnetic waves and provide the detected result to the second communication unit 236 to receive a signal, including the first device transmission 208. The second antenna 237 can provide a path or respond to currents or voltages provided by the second communication unit 236 to transmit a signal, including the second device transmission 210.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The communication system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the communication system 100 is described by operation of the first device 102 and the second device 106. It is understood that the first device 102 and the second device 106 can operate any of the modules and functions of the communication system 100.

Figure 3:
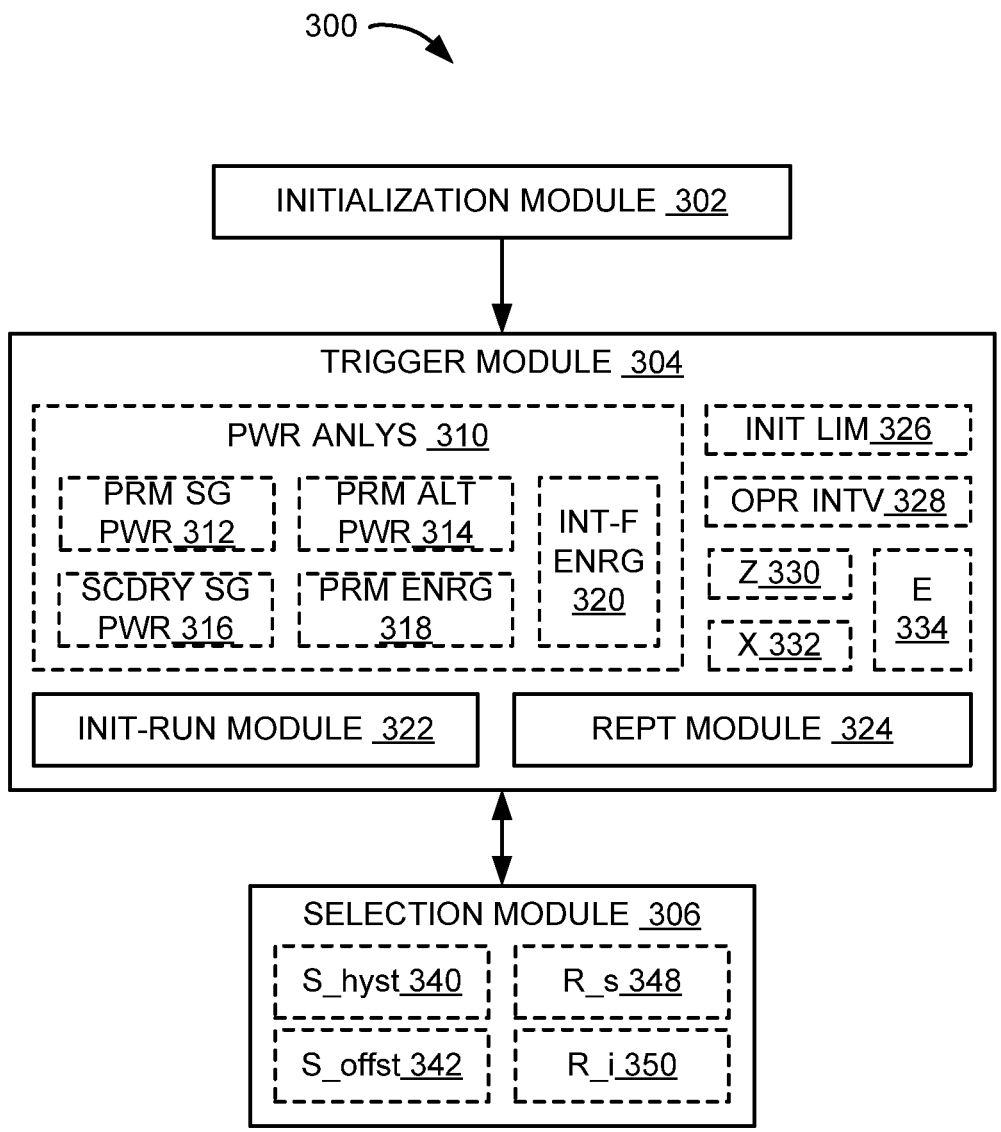
FIG. 3 is a control flow of the communication system of FIG. 1.

Referring now to FIG. 3, therein is shown a control flow 300 of the communication system 100 of FIG. 1. The communication system 100 can include an initialization module 302, a trigger module 304, a selection module 306, or a combination thereof.

The initialization module 302 can be coupled to the trigger module 304, which can be further coupled to the selection module 306. The modules can be coupled to each other in a variety of ways.

For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more outputs of the initialization module 302 can be connected to one or more inputs of the trigger module 304 using conductors or the transmission channel without intervening modules or devices there-between. Also for example, the trigger module 304 can be coupled to the selection module 306 directly, similar to the initialization module 302 and the trigger module 304, or indirectly using a wireless channel with a repeater, a switch, a routing device, or a combination thereof connecting the trigger module 304 and the selection module 306.

The communication system 100 can communicate with or using a device, such as by displaying images, recreating sounds, exchanging process steps or instructions, or a combination thereof. The communication system 100 can initiate the communication by sending information from a transmitting device to a receiving device. The receiving device can communicate with the user by displaying images, recreating sounds, exchanging process steps or instructions, or a combination thereof according to the information communicate to the device.

The initialization module 302 is configured to initialize the communication system 100 for communication. The initialization module 302 can identify or determine a power on state, a reset state, a state transition involving a radio resource control (RRC), or a combination thereof.

For example, the initialization module 302 can identify when the user initiates a power up sequence for the first device 102 of FIG. 1, changes into an active mode from an "airplane mode", or a combination thereof. Also for example, the initialization module 302 can identify a state transition for the first device 102 involving a dedicated channel (DCH) and a forward access channel (FACH).

The initialization module 302 can identify or determine the specified instances in a variety of ways. For example, the initialization module 302 can identify or determine based on notification or flagging instances sequenced within the specified conditions described above. Also for example, the initialization module 302 can identify or determine based on a program counter, a specific value in a designated register, activating a specific circuit in response to a sequence of instructions, or a combination thereof.

The initialization module 302 can select an initial instance of the second device 106 of FIG. 1, the serving cell, the transmission band, the serving frequency 130 of FIG. 1, or a combination thereof for communication. The initialization module 302 can include instructions or values predetermined by the communication system 100 for selecting the initial instance of the communication counterpart or the communication detail. For example, the initialization module 302 can include predetermined instructions for selecting the second band 154 of FIG. 1 or the fifth band 156 of FIG. 1, a specific value of the transmission frequency 116 of FIG. 1 therein, or a combination thereof.

The initialization module 302 can further receive the receiver signal 126 of FIG. 1 including the serving portion 128 of FIG. 1, the neighbor portion 132 of FIG. 1, or a combination thereof. The initialization module 302 can use the first antenna 217 of FIG. 2, the second antenna 237 of FIG. 2, the first communication unit 216 of FIG. 2, the second communication unit 236 of FIG. 2, or a combination thereof to receive the receiver signal 126. The initialization module 302 can use the first control unit 212 of FIG. 2, the second control unit 234 of FIG. 2, the first communication unit 216, the second communication unit 236, or a combination thereof to select the initial instance of the communication counterpart or the communication detail.

After initialize the communication system 100, the control flow 300 can pass to the trigger module 304. The control flow 300 can pass through a variety of ways. For example, control flow 300 can pass by having processing results of one module passed to another module, such as by passing the receiver signal 126 from the initialization module 302 to the trigger module 304, by storing the processing results at a location known and accessible to the other module, such as by storing the receiver signal 126, the determined components therein, or a combination thereof at a storage location known and accessible to the trigger module 304, by notifying the other module, such as by such as by using a flag, an interrupt, a status signal, or a combination for the trigger module 304, or a combination of processes thereof.

The trigger module 304 is configured to identify a condition or a circumstance for initiating a selection or a reselection of the corresponding device, the serving cell, the communication band, the transmission frequency 116, or a combination thereof. The trigger module 304 can initiate the selection or the reselection based on a power analysis result 310.

The power analysis result 310 is an observation, a measurement, a calculation outcome, or a combination thereof regarding the receiver signal 126. The trigger module 304 can generate the power analysis result 310 including the signal-interference measure 140 of FIG. 1, such as the serving measure 142 of FIG. 1, the neighbor measure 144 of FIG. 1, or a combination thereof, the serving power 136 of FIG. 1, the neighbor power 138 of FIG. 1, a primary signal power 312, a primary alternative power 314, a secondary signal power 316, the energy measure 146 of FIG. 1, such as a primary energy 318, an inter-frequency energy 320, or a combination thereof, the serving measure 142, the neighbor measure 144, or a combination thereof.

The trigger module 304 can measure the serving power 136, the neighbor power 138, or a combination thereof using the first communication unit 216, the second communication unit 236, the first control unit 212, the second control unit 234, or a combination thereof. The trigger module 304 can measure the serving power 136, the neighbor power 138, or a combination thereof including the pilot portion 114 of FIG. 1 corresponding to the serving portion 128, the neighbor portion 132, or a combination thereof.

The trigger module 304 can identify the pilot portion 114 corresponding to the serving portion 128, the neighbor portion 132, or a combination thereof. The trigger module 304 can measure the power of the individual portions corresponding to the unique instances of the pilot portion 114 to measure the serving power 136, the neighbor power 138, or a combination thereof.

The trigger module 304 can store the serving power 136, the neighbor power 138, or a combination thereof with the analysis history 158 of FIG. 1 in the first storage unit 214, the second storage unit 246, the first communication unit 216, the second communication unit 236, or a combination thereof. The trigger module 304 can further access previously-measured instances of the serving power 136, the neighbor power 138, or a combination thereof with the analysis history 158 through the first communication interface 228 of FIG. 2, the second communication interface 250 of FIG. 2, the first storage interface 248 of FIG. 2, the second storage interface 224 of FIG. 2, an interface unit coupled thereto, or a combination thereof.

The primary signal power 312 is a measured instance of the RSCP, such as the serving power 136 or a particular instance of the neighbor power 138, corresponding to a highest ranking condition relative to all other RSCP measurements. For example, the primary signal power 312 can include the measured RSCP corresponding to the best instance of the cell site, the frequency band, the transmission frequency 116, or a combination thereof, such as based on having the highest RSCP, least amount of delay, shortest estimated distance between devices, or a combination thereof.

The primary alternative power 314 is a measured instance of the RSCP corresponding to a highest ranking condition relative to RSCP measurements for instances of the neighbor power 138. For example, the primary alternative power 314 can include the measured RSCP corresponding to the best instance of the cell site, the frequency band, the transmission frequency 116, or a combination thereof among the neighbor cells, unused frequency bands, the neighbor frequency, or a combination thereof and excluding the serving cell.

The primary alternative power 314 can be similar to the primary signal power 312 except for available RSCP measurements based on the identity or the relationship of the corresponding cell site. The primary alternative power 314 can be based on same ranking condition as the primary signal power 312. The primary alternative power 314 and the primary signal power 312 can be the same RSCP measurement.

The secondary signal power 316 is a measured instance of the RSCP corresponding to a second highest ranking condition relative to all other RSCP measurements. For example, the secondary signal power 316 can include the measured RSCP corresponding to the second best instance of the cell site, the frequency band, the transmission frequency 116, or a combination thereof among all cell sites.

The secondary signal power 316 can be similar to the primary signal power 312, the primary alternative power 314, or a combination thereof except for the relative ranking. The secondary signal power 316 can be based on same ranking condition as the primary signal power 312. The secondary signal power 316 and the primary alternative power 314 can be the same RSCP measurement.

The trigger module 304 can further determine the energy measure 146 for the receiver signal 126. The trigger module 304 can determine the primary energy 318, the inter-frequency energy 320, or a combination thereof. The trigger module 304 can determine the energy measure 146 by measuring the power in the pilot portion 114 corresponding to the serving portion 128, the neighbor portion 132, or a combination thereof similarly for the serving power 136 and the neighbor power 138.

The trigger module 304 can further determine the energy measure 146 by calculating based on the measurement and the overall measured power. The trigger module 304 can combine the measured power for the pilot portion 114 with the serving power 136, the neighbor power 138, specific portions therein, or a combination thereof. For example, the trigger module 304 can determine the energy measure 146 as a ratio between the power corresponding to the pilot portion 114 and a combination amongst traffic, all other channels, the power corresponding to the pilot portion 114 itself, or a combination thereof corresponding to the serving portion 128, the neighbor portion 132, or a combination thereof.

The primary energy 318 is a determined instance of the EcIo corresponding to a highest ranking condition relative to all other EcIo determinations. For example, the primary energy 318 can include the determined instance of the EcIo corresponding to the best instance of the cell site, such as based on having the highest EcIo, least amount of delay, shortest estimated distance between devices, or a combination thereof.

The inter-frequency energy 320 is a determined instance of the EcIo corresponding to an inter-frequency determination or comparison. For example, the inter-frequency energy 320 can be based on the power in a portion corresponding to a single instance of the pilot portion 114 compared to overall power for all other signals.

The trigger module 304 can determine the primary energy 318 and the inter-frequency energy 320 similarly as the primary signal power 312 and the primary alternative power 314. For example, the trigger module 304 can determine the primary energy 318 as the energy measure 146 corresponding to a highest ranking condition relative to all other instances of the energy measure 146. As a more specific example, the primary energy 318 can include the determined EcIo corresponding to the best instance of the cell site, such as based on having the highest EcIo, least amount of delay, shortest estimated distance between devices, or a combination thereof.

The trigger module 304 can calculate the signal-interference measure 140. The trigger module 304 can calculate the signal-interference measure 140 based on the measured power, such as the serving power 136 or the neighbor power 138. The trigger module 304 can calculate the signal-interference measure 140 based on:

$$SIR = \frac{RSCP_T * \left(\frac{I_{or}}{E_c}\right)_T}{\sum_{k \neq T} RSCP_k \left(\frac{I_{or}}{E_c}\right)_k}.$$ Equation (1).

The term '$RSCP_T$' can represent an overall power for a specific signal or a specific portion within a signal 'T'. The term $\cdot \left(\frac{I_{or}}{E_c}\right)_T$, can represent the energy measure 146, or an inverse thereof, corresponding to the specific signal or the specific portion 'T'.

For example, the trigger module 304 can calculate the serving measure 142 based on the serving power 136 and the energy measure 146 for the serving portion 128, compared to the neighbor power 138 and the energy measure 146 for all instances of the neighbor portion 132. Also for example, the trigger module 304 can calculate a specific instance of the neighbor measure 144 based on the neighbor power 138 and the energy measure 146 for specific instance of the neighbor portion 132 corresponding to a unique instance of the neighbor frequency 134 of FIG. 1, compared to the power and EcIo for all instances of the neighbor portion 132 and the serving portion 128.

The trigger module 304 can generate the power analysis result 310 or an individual calculation or measure therein after an initialization process from the analysis history 158. The trigger module 304 can further generate the power analysis result 310 based on an intra-frequency search process when the neighbor power 138 is unavailable from the analysis history 158.

The trigger module 304 can initiate the selection or the reselection of the corresponding device, the serving cell, the serving band, the serving frequency 130, or a combination thereof based on the power analysis result 310. For example, the trigger module 304 can initiate the selection or the reselection based on the power analysis result 310 including the signal-interference measure 140, the energy measure 146, or a combination thereof. Also for example, the trigger module 304 can initiate the selection or the reselection for following an initialization process.

It has been discovered that initiating the selection or the reselection process based on the signal-interference measure 140 provides improved reliability. The signal-interference measure 140 can provide a comprehensive assessment for a quality of the serving portion 128 and reliably approximate the interfering conditions for a certain frequency and affecting the overall reliability for recovering the communication content. The signal-interference measure 140 can provide an improvements and comprehensibility missing in the energy measure 146 focusing only on the pilot portion 114.

The trigger module 304 can include an initial-run module 322, a repeat module 324, or a combination thereof. The trigger module 304 can use the triggering mechanism 160 of FIG. 1 implemented over the initial-run module 322, the repeat module 324, or a combination thereof.

The initial-run module 322 is configured to initiate the selection or the reselection based on the signal-interference measure 140 for following an initialization process. The initial-run module 322 can include the triggering mechanism 160 or a portion thereof to determine a scenario or a set of conditions specific to initializing the selection or the reselection process immediately after the initialization process. For example, the trigger module 304 can utilize the initial-run module 322 immediately following power on or state transition as for the initialization module 302.

The initial-run module 322 can utilize an initialization limit 326, an operation interval, or a combination thereof. The operation interval 328 can include time, number of instructions, number of cycles, or a combination thereof between specific processes or instructions. For example, the operation interval 328 can include a duration since last-occurrence of the selection or the reselection process, such as the signal-interference selection mechanism 164 of FIG. 1 or the energy selection mechanism 166 of FIG. 1.

The initialization limit 326 can include a threshold value for the time, the number of instructions, the number of cycles, or a combination thereof for limiting a frequency in initializing the selection or the reselection process. For example, the initialization limit 326 can include one or more threshold values between 10 seconds to 5 minutes. For a more specific example, the initialization limit 326 can be 10-30 seconds for FACH transition, 20-60 seconds for idle state, or a combination thereof.

The initial-run module 322 can initiate the selection or the reselection based on the serving frequency 130, the serving power 136, the initialization limit 326, the operation interval, or a combination thereof. For example, the initial-run module 322 can initiate the selection or the reselection by determining an analyzing the initial instance of the serving frequency 130 as initialized by the initialization module 302 following the FACH transition or the power-on process. As a more specific example, the initial-run module 322 can initiate the selection or the reselection when the initial instance of the serving frequency 130 is the fifth band 156.

Also for example, the initial-run module 322 can determine the initialization limit 326 and the operation interval 328, and by comparing the initialization limit 326 and the operation interval 328. As a more specific example, the initial-run module 322 can initiate the selection or the reselection when the operation interval 328 is less than the initialization limit 326.

Also for example, the initial-run module 322 can determine a signal-interference threshold 330 as a limit on a quality or a characteristic of the receiver signal 126 represented by the signal-interference measure 140 for initiating the selection or the reselection. The signal-interference threshold 330 can be a value for the signal-interference measure 140 predetermined by the communication system 100. The signal-interference threshold 330 can be a value between 0 dB and 20 dB. The signal-interference threshold 330 can be represented as 'Z'.

Continuing with the example, the initial-run module 322 can initiate the selection or the reselection based on comparing the serving measure 142 to the signal-interference threshold 330. As a more specific example, the initial-run module 322 can initiate the selection or the reselection when the serving measure 142 is less than the signal-interference threshold 330.

Also for example, the initial-run module 322 can perform an inter-frequency search or measurement for a limited number of instances for the neighbor portion 132 in the receiver signal 126. As a more specific example, the initial-run module 322 can perform the inter-frequency search or measurement for up to two or five instances of the neighbor frequency 134 as included in the receiver signal 126. The initial-run module 322 can calculate the neighbor measure 144 corresponding to each instance of the neighbor frequency 134.

It has been discovered that initiating the selection or the reselection process based on the serving measure 142 provides improved reliability. The serving measure 142 can provide a comprehensive assessment for a quality of the serving portion 128 affecting the overall reliability for recovering the communication content. The serving measure 142 can provide an improvement in comprehensively assessing the quality over using the energy measure 146 focusing only on the pilot portion 114.

The initial-run module 322 can initiate the selection or the reselection process for the transmission frequency 116 by immediately triggering the selection module 306 for the signal-interference selection mechanism 164 based on the serving measure 142, the initial instance of the serving frequency 130, the initialization limit 326, or a combination thereof, as described above. The initial-run module 322 can initiate the selection or the reselection process for immediately selecting the transmission frequency 116 by immediately triggering the selection module 306 without the regular interval 162 of FIG. 1, such as mandatory delay or buffer required before the communication system 100 can initiate the selection or the reselection process.

It has been determined that immediately triggering for the selection or reselection process based on the serving measure 142 provides improved throughput and data rate. The immediate triggering based on the serving measure 142 can ensure a consideration for reselection based on conditions without being required to wait for the regular interval 162.

It has also been determined that triggering the selection or reselection process based on the initialization limit 326 provides improved efficiency. The initialization limit 326 can prevent inefficiency resulting triggering the selection or reselection process too frequently and resulting in Ping-Pong behavior of frequently switching back and forth between transmission bands or cell sites without gaining any significant improvements.

The repeat module 324 is configured to periodically trigger the selection or reselection process based on conditions or circumstances. The repeat module 324 can trigger the selection or reselection process whenever the first device 102 UMTS physical layer (UPHY) search or measures the inter-frequency neighbors.

The repeat module 324 can trigger the selection or reselection process based on the operation interval 328 exceeding the initialization limit 326. The repeat module 324 can further trigger the selection or reselection process based on the signal-interference measure 140, the signal-interference threshold 330, the energy measure 146, the initialization limit 326, or a combination thereof.

For example, the repeat module 324 can trigger the selection module 306 for initiating the signal-interference selection mechanism 164 based on the primary signal power 312. As a more specific example, the repeat module 324 can trigger the selection module 306 based on the primary signal power 312 exceeding a power threshold 332.

Continuing with the example, the power threshold 332 can be a limit on a quality or a characteristic of the receiver signal 126 as represented by the serving power 136 or the neighbor power 138 for initiating the selection or the reselection. The power threshold 332 can be a value for the serving power 136 or the neighbor power 138 predetermined by the communication system 100. The power threshold 332 can be a value between −10 dBm and −80 dBm. The power threshold 332 can be represented as 'X'.

Also for example, the repeat module 324 can trigger the selection module 306 for initiating the signal-interference selection mechanism 164 based on the primary energy measure 146. As a more specific example, the repeat module 324 can trigger the selection module 306 based on the primary energy measure 146 exceeding an energy threshold 334.

Continuing with the example, the energy threshold 334 can be a limit on a quality or a characteristic of the receiver signal 126 as represented by the energy measure 146 for initiating the selection or the reselection. The energy threshold 334 can be a value for the energy measure 146 predetermined by the communication system 100 or a communication standard. The energy threshold 334 can be represented as 'E'.

Also for example, the repeat module 324 can trigger the selection module 306 for initiating the energy selection mechanism 166 instead of the signal-interference selection mechanism 164. As a more specific example, the repeat module 324 can trigger the selection module 306 for initiating the energy selection mechanism 166 when the primary signal power 312 does not exceed the power threshold 332, the primary energy measure 146 does not exceed the energy threshold 334, or a combination thereof.

For further example, the repeat module 324 can further trigger the selection module 306 based on a selection quality, represented as '$S_{qual}$', and an inter-search quality, represented as '$S_{intersearch}$'. The selection quality and the inter-search quality can be based on requirements and descriptions by a communication standard, such as 3GPP. The repeat module 324 can utilize the above described conditions, either singly or in combination, when the selection quality is less than the inter-search quality.

Also for further example, the repeat module 324 can trigger the selection module 306 for initiating the signal-interference selection mechanism 164 when the selection quality is greater than the inter-search quality. The repeat module 324 can initiate the signal-interference selection mechanism 164 based on the signal-interference measure 140, including when the serving measure 142 is less than the signal-interference threshold 330.

The repeat module 324 can further adjust the initialization limit 326 based on estimation of the transmitter signal 112 of FIG. 1. For example, the repeat module 324 can adjust the initialization limit 326 when switching from a voice call to a data call, when the first device 102 is moving, when the channel condition varies, or a combination thereof. The repeat module 324 can adjust the initialization limit 326 to a shorter duration for such conditions.

Also for example, the repeat module 324 can adjust the initialization limit 326 based on a power-consumption metric. The repeat module 324 can adjust the initialization limit 326 to a longer duration when a power consumption from periodic inter-frequency cell search or measurement exceeds a power threshold predetermined by the computing system 100.

It has been discovered that the periodic consideration for initiating the selection or reselection process using a comparison between the primary signal power 312, the serving power 136, the neighbor power 138, or a combination thereof provides improved throughput while providing efficiency. The primary signal power 312, the serving power 136, the neighbor power 138, or a combination thereof can be used to identify the cell site or the frequency band having the best signal quality, which can be used to ensure a desirable benefit of switching the transmission frequency 116.

It has further been discovered that the periodic consideration for initiating the selection or reselection process using the serving measure 142 provides improved reliability. The serving measure 142 can provide a comprehensive assessment for a quality of the serving portion 128 affecting the overall reliability for recovering the communication content. The serving measure 142 can provide an improvement in comprehensively assessing the quality over using the energy measure 146 focusing only on the pilot portion 114.

It has further been discovered that selecting between the signal-interference selection mechanism 164 and the energy selection mechanism 166 provides improved flexibility for various circumstances. The selection between the signal-interference selection mechanism 164 and the energy selection mechanism 166 can maximize processing resources and throughput specifically for different situations.

It has further been discovered that adjusting the initialization limit 326 based on estimation of the transmitter signal 112 and the power-consumption metric provides improved battery life and reliability. The adjustments to the initialization limit 326 can be used to maximize the processing power based on an estimation of a demand for data. Further, the adjustments to the initialization limit 326 eliminating unnecessary processes can improve the power used for operating the communication system 100.

The trigger module 304, including the initial-run module 322 and the repeat module 324, can use the first communication unit 216, the second communication unit 236, the first control unit 212, the second control unit 234, or a combination thereof to identify the condition or the circumstance for initiating the selection or the reselection process as described above. The trigger module 304 can store the power analysis result 310 or any other processing results in the first communication unit 216, the second communication unit 236, the first storage unit 214, the second storage unit 246, or a combination thereof.

After identifying the condition or the circumstance, the trigger module 304 can initiate the selection process by passing the control flow to the selection module 306. The control flow can pass similarly as described above between the initialization module 302 and the trigger module 304, but using the processing results of the trigger module 304, such as a flag or an identifier for the signal-interference selection mechanism 164 or the energy selection mechanism 166.

The selection module 306 is configured to select the corresponding device, the serving cell, the serving band, the serving frequency 130, or a combination thereof for communicating through the first device 102, the second device 106, or a combination thereof. The selection module 306 can select by implementing the signal-interference selection mechanism 164, the energy selection mechanism 166, or a combination thereof. The selection module 306 can select based on the signal-interference measure 140, a measure hysteresis 340, a measure offset 342, or a combination thereof.

The measure hysteresis 340 is a quantity representing an amount of separation between power levels corresponding to the serving frequency 130. The measure hysteresis 340 can be for controlling the selection or reselection process and for preventing the 'Ping-Pong' behavior of frequently changing the serving frequency 130, the serving site, the serving frequency band, the corresponding device, or a combination thereof.

The measure hysteresis 340 can be any value for specifying the separation between power levels controlling changes in the serving frequency 130. The measure hysteresis 340 can be based on the current instance of the serving frequency 130, the serving site, the serving bandwidth, the corresponding device, or a combination thereof.

For example, the measure hysteresis 340 can favor the second band 154. As a more specific example, the measure hysteresis 340 can be 2 dB when the serving frequency 130 is in the second band 154, 0 when the serving frequency 130 is not in the second band 154, or a combination thereof.

The measure offset 342 is a quantity representing an amount of separation between power levels corresponding to the neighbor frequency 134. The measure offset 342 can be similar to the measure hysteresis 340. For example, the measure offset 342 can be any value for specifying the separation between power levels for controlling the selection or reselection process associated with the neighbor frequency 134. Also for example, the measure offset 342 can be based on the neighbor frequency 134.

As a more specific example, the measure offset 342 can favor the second band 154. The measure offset 342 can be 0 when the neighbor frequency 134 is in the second band 154, 2 dB when the neighbor frequency 134 is not in the second band 154, or a combination thereof.

The selection module 306 can determine the measure hysteresis 340, the measure offset 342, or a combination thereof. The selection module 306 can determine the measure hysteresis 340, the measure offset 342, or a combination thereof by identifying the serving frequency 130, the neighbor frequency 134, or a combination thereof relative to the communication band-set 152 of FIG. 1.

The selection module 306 can select the measure hysteresis 340, the measure offset 342, or a combination thereof predetermined by the computing system 100 and stored in the first communication unit 216, the second communication unit 236, the first storage unit 214, the second storage unit 246, or a combination thereof. The selection module 306 can select the measure hysteresis 340, the measure offset 342, or a combination thereof according to the serving frequency 130, the neighbor frequency 134, or a combination thereof. For example, the selection module 306 can select the values on a look up table or a linked data structure according to the serving frequency 130, the neighbor frequency 134, or a combination thereof as the measure hysteresis 340, the measure offset 342, or a combination thereof.

The selection module 306 can use the measure hysteresis 340, the measure offset 342, or a combination thereof to calculate a signal ranking, such as a serving ranking 348, a neighbor ranking 350, or a combination thereof based on the signal-interference measure 140. The signal ranking is a calculated measure representing a quality of the transmission frequency 116 for selecting the serving frequency 130. The signal ranking can include considerations for various scenarios or conditions.

The serving ranking 348 is the signal ranking for the serving frequency 130, the serving site, the serving band, or a combination thereof. The neighbor ranking 350 is the signal ranking for the neighbor frequency 134, the neighbor source 118 of FIG. 1, the neighbor frequency band, or a combination thereof.

The serving ranking 348, the neighbor ranking 350, or a combination thereof can be based on the signal-interference measure 140, the measure hysteresis 340, the measure offset 342, or a combination thereof. For example, the serving ranking 348 can be based on the serving measure 142, the measure hysteresis 340, or a combination thereof. The neighbor ranking 350 can be based on the neighbor measure 144, the measure offset 342, or a combination thereof.

As a more specific example, the serving ranking 348 corresponding to the serving frequency 130 can be based on:

$$R_{SIRs} = SIR_s + S_{hyst,s}.\quad\text{Equation (2).}$$

The serving ranking 348 can be represented as '$R_{SIRs}$'. The serving measure 142 can be represented as '$SIR_s$', and the measure hysteresis 340 can be represented as '$S_{hyst,s}$'.

Also as a more specific example, the neighbor ranking 350 corresponding to '$i^{th}$' instance of the neighbor frequency 134 can be based on:

$$R_{SIRi} = SIR_i - S_{offset,i}.\quad\text{Equation (3).}$$

The neighbor ranking 350 can be represented as '$R_{SIRi}$'. The neighbor measure 144 can be represented as '$SIR_i$', and the measure offset 342 can be represented as '$S_{offset,i}$'.

The selection module 306 can calculate the signal ranking for the serving portion 128 and for each instances of the neighbor portion 132 in the receiver signal 126. The selection module 306 can process a set of all instances the signal ranking corresponding to the receiver signal 126 for the selection process. The selection module 306 can analyze all serving or non-serving instances of the frequency bands, the communication frequencies, cell sites, or a combination thereof.

The selection module 306 can use the serving ranking 348 and the neighbor ranking 350 to select or reselect a new instance of the serving frequency 130 for implementing the signal-interference selection mechanism 164. The selection module 306 can select the transmission frequency 116 by comparing the serving measure 142 and the neighbor measure 144 through the serving ranking 348 and the neighbor ranking 350. For example, the selection module 306 can change or update the serving frequency 130 when the serving frequency 130 and the neighbor frequency 134 are in the same bands and the neighbor measure 144 is greater than the serving measure 142 at least by the measure hysteresis 340, the measure offset 342, or a combination thereof, such as by 2 dB.

Also for example, the selection module 306 can change or update when the serving frequency 130 is in the fifth band 156 with the neighbor frequency 134 in the second band 154, and the neighbor measure 144 is greater than the serving measure 142 by the measure hysteresis 340, the measure offset 342, or a combination thereof, including 0. Also for example, the selection module 306 can change or update when the serving frequency 130 is in the second band 154 with the neighbor frequency 134 in the fifth band 156, and the neighbor measure 144 is greater than the serving measure 142 at least by the measure hysteresis 340, the measure offset 342, or a combination thereof, such as 4 dB.

Also for example, the selection module 306 can analyze the instances of the neighbor frequency 134. The selection module 306 can the neighbor frequency 134 based on the corresponding instance of the neighbor power 138, the neighbor ranking 350 in comparison to the serving ranking 348, the energy measure 146, or a combination thereof. As a more specific example, the selection module 306 can identify an instance of the neighbor frequency 134 including the neighbor power 138 greater than power threshold 332, the energy measure 146 greater than the energy threshold, the neighbor ranking 350 greater than the serving ranking 348, or a combination thereof.

The selection module 306 can select the corresponding device, the serving cell, the serving band, the serving frequency 130, or a combination thereof based on the serving ranking 348, the neighbor ranking 350, or a combination thereof, including the measure hysteresis 340, the measure offset 342, or a combination thereof. For example, the selection module 306 can set the serving frequency 130 as the neighbor frequency 134 satisfying the various conditions listed above.

Also for example, the selection module 306 can further set the serving frequency 130 as the instance of the neighbor frequency 134 including the highest instance of the neighbor power 138 among the detected or analyzed instances of the neighbor frequency 134. The selection module 306 can also select the neighbor frequency 134 associated with the neighbor portion 132 corresponding to a highest instance of the neighbor ranking 350. The neighbor frequency 134 can include the transmission frequency 116 from the neighbor source 118, from within the serving band, from a different band, or a combination thereof.

The selection module 306 can further select between the signal-interference selection mechanism 164 and the energy selection mechanism 166. The selection module 306 can select the signal-interference selection mechanism 164 as described above using the power threshold 332, the energy threshold 334, or a combination thereof as described above. The selection module 306 can further select the energy selection mechanism 166 for selecting the serving frequency 130 when all instances of the neighbor frequency 134 correspond to the neighbor power 138 less than the power threshold 332, the energy measure 146 less than the energy threshold 334, the neighbor ranking less than the serving ranking 348, or a combination thereof.

It has been discovered that the serving ranking 348 and the neighbor ranking 350 provides improved throughput and increased efficiency. The serving ranking 348 and the neighbor ranking 350 can utilize the signal-interference measure 140 to consider the overall behavior of signals. The serving ranking 348 and the neighbor ranking 350 can further prevent Ping-Pong behavior.

For illustrative purposes, the communication system 100 is described as for accommodating communication for 3GPP. However, it is understood that the triggering mechanism 160 and the signal-interference selection mechanism 164 can be adjusted or used for other standards, such as for WiFi or 4G LTE.

The selection module 306 can use the first communication unit 216, the second communication unit 236, the first control unit 212, the second control unit 234, or a combination there of to select the serving frequency 130. The selection module 306 can store the serving frequency 130 or any processing results in the first storage unit 214, the second storage unit 246, the first communication unit 216, the second communication unit 236, or a combination thereof.

The control flow 300 or the method 300 of operation of the communication system 100 includes: receiving a receiver signal; generating a power analysis result including a signal-interference measure based on the receiver signal; and selecting the transmission frequency with a communication unit based on the signal-interference measure for communicating through a device.

Figure 4:
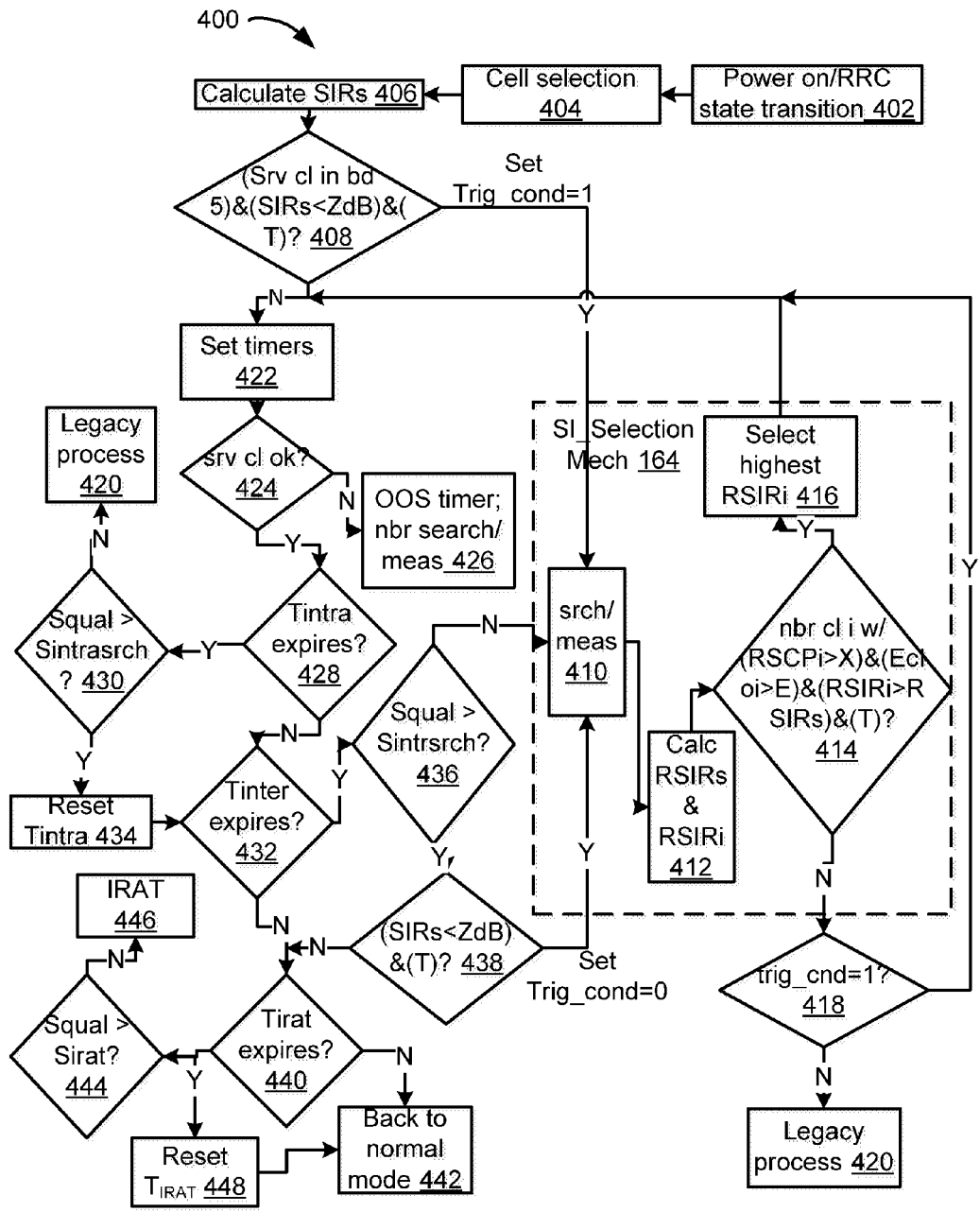
FIG. 4 is a detailed flow of the communication system of FIG. 1.

Referring now to FIG. 4, therein is shown a detailed flow 400 of the communication system 100 of FIG. 1. The control flow 300 of FIG. 3 can include the detailed flow 400. The detailed flow 400 can show further details of the control flow 300.

The detailed flow can include a power-on or state transition block 402. The initialization module 302 of FIG. 3 can determine the power on state, the reset state, the state transition involving the RRC, or a combination thereof for the power-on or state transition block 402.

The power-on or state transition block 402 can be coupled to a cell selection block 404. The initialization module 302 can select the initial instance of the second device 106 of FIG. 1, the serving cell, the transmission band, the serving frequency 130 of FIG. 1, or a combination thereof for communication for the cell selection block 404. The initialization module 302 can initiate the first device 102 of FIG. 1 to camp on the serving frequency 130 in a suitable transmission band for a suitable cell site.

The cell selection block 404 can be coupled to a calculate SIR block 406. The trigger module 304 of FIG. 3 can generate the power analysis result 310 of FIG. 3, including calculating the signal-interference measure 140 of FIG. 1. For example, the trigger module 304 can calculate the serving measure 142 of FIG. 1 for the calculate SIR block 406.

The calculate SIR block 406 can be coupled to an initial decision block 408. The trigger module 304 can perform the initial decision block 408 based on the serving frequency 130, the signal-interference measure 140, the signal-interference threshold 330 of FIG. 3, the initialization limit 326 of FIG. 3, or a combination thereof for the calculate SIR block 406. For example, the trigger module 304 can determine if the serving frequency 130 is in the fifth band 156 of FIG. 1, if the serving measure 142 is less than the signal-interference threshold 330, if the operation interval 328 of FIG. 3 is less than the initialization limit 326, or a combination thereof.

The initial decision block 408 can be coupled to a search or measure block 410. The initial decision block 408 can set a trigger condition, such as a non-zero value or TRUE, and pass the detailed flow 400 to the search or measure block 410 based on a variety of conditions. Continuing with the example, the detailed flow 400 can pass when the serving frequency 130 is in the fifth band 156, when the serving measure 142 is less than the signal-interference threshold 330, when the operation interval 328 of is less than the initialization limit 326, or a combination thereof.

The search or measure block 410 can be an initial portion of the signal-interference selection mechanism 164 of FIG. 1. The trigger module 304, the selection module 306 of FIG. 3, or a combination thereof can perform an inter-frequency search or measure for all detectable portions of the receiver signal 126 of FIG. 1 for the search or measure block 410. The trigger module 304, the selection module 306, or a combination thereof can determine the serving portion 128 of FIG. 1 and all instances of the neighbor portion 132 of FIG. 1.

The search or measure block 410 can be coupled to a calculate power block 412. The selection module 306 can calculate the signal ranking including the serving ranking 348 of FIG. 3 and the neighbor ranking 350 of FIG. 3 for the calculate power block 412. The calculate power block 412 can be for implementing the signal-interference selection mechanism 164.

The calculate power block 412 can be coupled to a neighbor decision block 414. The selection module 306 can implement the neighbor decision block 414 by analyzing instances of the neighbor frequency 134 of FIG. 1 or associated analysis results.

For example, the selection module 306 can determine the neighbor frequency 134 satisfying conditions based on the neighbor power 138 of FIG. 1, the power threshold 332 of FIG. 3, the inter-frequency energy 320 of FIG. 3, the energy threshold 334 of FIG. 3, the serving ranking 348, the neighbor ranking 350, or a combination thereof corresponding to the neighbor frequency 134 for the neighbor decision block 414. As a more specific example, the selection module 306 can determine whether an instance of the neighbor frequency 134 is associated with the neighbor power 138 greater than the power threshold 332, the inter-frequency energy 320 greater than the energy threshold 334, the neighbor ranking 350 greater than the serving ranking 348, or a combination thereof.

When the conditions are satisfied for the neighbor decision block 414, the detailed flow can pass to a select frequency block 416 for the signal-interference selection mechanism 164. The selection module 306 can select the serving frequency 130 as the neighbor frequency 134 having the highest instance of the neighbor measure 144 of FIG. 1 associated thereto for the select frequency block 416. When the conditions are not satisfied for the neighbor decision block 414, the detailed flow can pass to a trigger condition verification block 418. The selection module 306 can check the trigger condition.

The trigger condition verification block 418 can be coupled to a legacy process block 420. The selection module 306 can utilize mechanisms other than the signal-interference selection mechanism 164, such as the energy selection mechanism 166 of FIG. 1, for the legacy process block 420. The detailed flow 400 can pass to the legacy process block 420 when the trigger condition has not been set, such as the trigger condition including a zero value or FALSE, for reselecting the serving frequency 130.

The initial decision block 408, the select frequency block 416, the trigger condition verification block 418, or a combination thereof can be coupled to a set timers block 422. The detailed flow 400 can pass to the set timers block 422 when conditions for the initial decision block 408 is not met, after reselecting the serving frequency 130 for the select frequency block 416, when the trigger condition is set for the trigger condition verification block 418, or a combination thereof.

The trigger module 304 can set various timers, such as the operation interval 328, an intra-frequency timer, an inter-frequency timer, an inter-radio timer, or a combination thereof for the set timers block 422. The trigger module 304 can set various timers to a designated value or 0.

The set timers block 422 can be coupled to a serving cell decision block 424. The trigger module 304 can determine a suitability of the serving cell, such as based on the serving power 136 of FIG. 1, the serving measure 142, or a combination thereof.

The serving cell decision block 424 can be coupled to an out of service block 426, the intra-frequency consideration block 428, or a combination thereof. The trigger module 304 can consider or set an out of service (OOS) timer, perform a search or measurement for instances of the neighbor frequency 134, or a combination thereof for the out of service block 426. The trigger module 304 can perform the out of service block 426 when the serving cell is not suitable according to the serving cell decision block 424.

The trigger module 304 can determine whether the intra-frequency timer has expired for the intra-frequency consideration block 428. The detailed flow 400 can pass to an intra-quality comparison block 430 when the intra-frequency timer has expired or an inter-frequency consideration block 432.

The trigger module 304 can compare the selection quality, represented as '$S_{qual}$', and an intra-search quality, represented as '$S_{intrasearch}$', for the intra-quality comparison block 430. The trigger module 304 can reset the intra-frequency timer when the selection quality is greater than the intra-search quality for a reset intra-frequency timer 434.

The detailed flow 400 can pass to the legacy process block 430 when the selection quality is not greater than the intra-search quality. The selection module 306 can utilize mechanisms other than the signal-interference selection mechanism 164, such as the energy selection mechanism 166, for the legacy process block 420.

The detailed flow 400 can pass to the inter-frequency consideration block 432 after resetting the intra-frequency timer or when the intra-frequency timer has not expired. The trigger module 304 can further can determine whether the inter-frequency timer has expired for the inter-frequency consideration block 432. The inter-frequency consideration block 432 can be coupled to an inter-quality comparison block 436. The detailed flow 400 can pass to the inter-quality comparison block 436 when the inter-frequency timer has timed out.

The trigger module 304 can initiate the signal-interference selection mechanism 164 when the selection quality is not greater than an inter-search quality, represented as '$S_{intersearch}$'. The detailed flow 400 can pass to the search or measure block 410 when the selection quality is not greater than the inter-search quality.

The detailed flow 400 can pass to a periodic decision block 438 when the selection quality is greater than the inter-search quality. The trigger module 304 can determine initiating the signal-interference selection mechanism 164 based on the signal-interference measure 140, the signal-interference threshold 330, the initialization limit 326, or a combination thereof for the periodic decision block 438.

The trigger module 304 can initiate the signal-interference selection mechanism 164 in the periodic decision block 438 similar to in the initial decision block 408, but for the initialization limit 326. For example, the trigger module 304 can initiate the signal-interference selection mechanism 164 by passing the detailed flow 400 to the search or measure block 410 based on the serving measure 142 less than the signal-interference threshold 330, the operation interval 328 greater than the initialization limit 326, or a combination thereof. The trigger module 304 can set the trigger condition to a zero value or FALSE when the detailed flow 400 passes to the search or measure block 410 from the periodic decision block 438.

The periodic decision block 438, the inter-frequency consideration block 432, or a combination thereof can be coupled to an inter-radio decision block 440. The detailed flow 400 can pass to the inter-radio decision block 440 from the periodic decision block 438 when the serving measure 142 is not less than the signal-interference threshold 330, when the operation interval 328 is not greater than the initialization limit 326, or a combination thereof. The detailed flow 400 can further pass to the inter-radio decision block 440 from the inter-frequency consideration block 432 when the inter-frequency timer has not timed out.

The trigger module 304 can determine whether the inter-radio timer for the inter-radio access technology (IRAT) has timed out for the inter-radio decision block 440. The detailed flow 400 can pass to a normal mode block 442 when the inter-radio timer has not timed out. The trigger module 304 can go into a sleep mode in idle, continue on to FACH, or a combination thereof for the first device 102 for the normal mode block 442.

The detailed flow 400 can further pass to an IRAT-quality comparison block 444 when the inter-radio timer has timed out. The trigger module 304 can calculate and compare the selection quality to an IRAT quality, represented as '$S_{IRAT}$'. The detailed flow 400 can pass to an IRAT block 446 when the selection quality is not greater than the IRAT quality. The selection module 306 can implement an IRAT process for searching and measuring neighbor frequencies and for reselecting the serving frequency 130 for the IRAT block 446.

The detailed flow 400 can further pass to a reset IRAT timer block 448 when the selection quality is greater than the IRAT quality. The trigger module 304 can reset the inter-radio timer for the reset IRAT timer block 448. The detailed flow 400 can further pass to the normal mode block 442 after resetting the inter-radio timer.

The modules described in this application can be hardware implementation or hardware accelerators, including passive circuitry, active circuitry, or both, in the first communication unit 216 of FIG. 2, the second communication unit 236 of FIG. 2, the first control unit 216 of FIG. 2, the second control unit 238 of FIG. 2, or a combination thereof. The modules can also be hardware implementation or hardware accelerators, including passive circuitry, active circuitry, or both, within the first device 102 of FIG. 1 or the second device 106 of FIG. 2, but outside of the first communication unit 216, the second communication unit 236, the first control unit 216, the second control unit 238, or a combination thereof.

The communication system 100 of FIG. 1 has been described with module functions or order as an example. The communication system 100 can partition the modules differently or order the modules differently. For example, the functions of the trigger module 304 of FIG. 3 and the selection module 306 of FIG. 3 can be combined. Also for example, the selection module 306 can include a sub-module for performing each of the different selection mechanisms.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 216, the second communication unit 236, the first storage unit 214, the second storage unit 246, or a combination thereof can represent the non-transitory computer readable medium. The first communication unit 216, the second communication unit 236, first storage unit 214, the second storage unit 246, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the signal-interference measure 140, such as for signal quality of the transmitter signal 112, the neighbor signal 120 of FIG. 1, or different frequency signals experiencing dynamically changing channels, results in the movement in the physical world, such as content displayed or recreated for the user on the first device 102. The content reproduced on the first device 102, such as navigation information or voice signal of a caller, can influence the user's movement, such as following the navigation information or replying back to the caller. Movement in the physical world results in changes to the channels and further the qualities of different signals, which can be fed back into the communication system 100 and influence the selection of the serving frequency 130.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
an antenna configured to receive a receiver signal for representing a combination of a serving portion and a neighbor portion for a serving signal and a neighbor signal;
a communication unit, coupled to the antenna, configured to:
generate a power analysis result including a signal-interference measure based on the receiver signal, the signal-interference measure for representing a comparison between total overall power measurements for multiple channels corresponding to the serving signal and multiple channels corresponding to the neighbor signal;
calculate a serving measure corresponding to the signal-interference measure of the serving portion and a neighbor measure corresponding to the signal-interference measure of the serving portion and a neighbor portion; and
select a transmission frequency based on the signal-interference measure by comparing the serving, measure and the neighbor measure for communicating through a device.

2. The system as claimed in claim 1 wherein the communication unit is configured to:
calculate a serving ranking and a neighbor ranking based on the signal-interference measure; and
select the transmission frequency further based on selecting the transmission frequency based on the serving ranking corresponding to the serving measure and the neighbor ranking corresponding to the neighbor measure.

3. The system as claimed in claim 1 wherein the communication unit is configured to:
generate the power analysis result including the serving measure for the signal-interference measure;
determine an initial instance of a serving frequency;
determine an initialization limit for selecting the transmission frequency; and
select the transmission frequency further based on immediately reselecting the serving frequency based on the serving measure, the initial instance of the serving frequency, the initialization limit, or a combination thereof.

4. The system as claimed in claim 1 wherein the communication unit is configured to:
generate the power analysis result including a primary signal power, a primary energy, a primary alternative power, an inter-frequency energy, or a combination thereof; and
select the transmission frequency further based on initiating a signal-interference selection mechanism based on the primary signal power, the primary energy, the primary alternative power, the inter-frequency energy, or a combination thereof.

5. The system as claimed in claim 1 wherein the communication unit is configured to:
generate the power analysis result including a primary signal power, a primary energy, a primary alternative power, an inter-frequency energy, or a combination thereof; and
select the transmission frequency further based on initiating an energy selection mechanism based on the primary signal power, the primary energy, the primary alternative power, the inter-frequency energy, or a combination thereof.

6. The system as claimed in claim 1 wherein:
the antenna is configured to receive the receiver signal including multiple instances of a neighbor portion;
the communication unit is configured to:
calculate instances of a neighbor ranking, each instance of the neighbor ranking for representing each instance of the neighbor portion; and
select the transmission frequency further based on selecting a neighbor frequency associated with the neighbor portion corresponding to a highest instance of the neighbor ranking.

7. The system as claimed in claim 1 wherein the communication unit is configured to select the transmission frequency based on immediately selecting the transmission frequency for selecting the transmission frequency without a regular interval.

8. The system as claimed in claim 1 wherein the communication unit is configured to:
determine a measure hysteresis and a measure offset for selecting the transmission frequency;
calculate a serving ranking and a neighbor ranking based the measure hysteresis and the measure offset; and
select the transmission frequency further based on selecting the transmission frequency based on the serving ranking corresponding to the serving measure and the neighbor ranking corresponding to the neighbor measure.

9. The system as claimed in claim 1 wherein the communication unit is configured to select the transmission frequency further based on selecting between a signal-interference selection mechanism and an energy selection mechanism based on a power threshold and an energy threshold.

10. A method of operation of a communication system comprising:
receiving a receiver signal for representing a combination of a serving portion and a neighbor portion for a serving signal and a neighbor signal;

generating a power analysis result including a signal-interference measure based on the receiver signal, the signal-interference measure for representing a comparison between total overall power measurements for multiple channels corresponding to the serving signal and multiple channels corresponding to the neighbor signal;

selecting a transmission frequency with a communication unit based on the signal-interference measure for communicating through a device;

wherein:
generating the power analysis result includes generating a serving measure corresponding to the serving portion and a neighbor measure corresponding to the neighbor portion; and selecting the transmission frequency includes selecting, the transmission frequency by comparing the serving measure and the neighbor measure.

11. The method as claimed in claim 10 further comprising:
calculating a serving ranking and a neighbor ranking based on the signal-interference measure; and wherein:
selecting the transmission frequency includes selecting the transmission frequency based on the serving ranking corresponding to the serving measure and the neighbor ranking corresponding to the neighbor measure.

12. The method as claimed in claim 10 further comprising:
determining an initial instance of a serving frequency;
determining an initialization limit for selecting the transmission frequency;

wherein:
generating the power analysis result includes generating the power analysis result including the serving measure for the signal-interference measure; and selecting the transmission frequency includes immediately selecting the transmission frequency based on the serving measure, the initial instance of the serving frequency, the initialization limit, or a combination thereof.

13. The method as claimed in claim 10 wherein:
generating the power analysis result includes generating the power analysis result including a primary signal power, a primary energy, a primary alternative power, an inter-frequency energy, or a combination thereof;

selecting the transmission frequency includes selecting the transmission frequency by initiating a signal-interference selection mechanism based on the primary signal power, the primary energy, the primary alternative power, the inter-frequency energy, or a combination thereof.

14. A non-transitory computer readable medium including instructions for a communication system comprising:
receiving a receiver signal for representing a combination of a serving portion and a neighbor portion for a serving signal and a neighbor signal;

generating a power analysis result including a signal-interference measure based on the receiver signal, the signal-interference measure for representing a comparison between total overall power measurements for multiple channels corresponding to the serving signal and multiple channels corresponding to the neighbor signal;

selecting a transmission frequency a communication unit based on the signal-interference measure for communicating through a device; and wherein:
generating the power analysis result includes generating a serving measure corresponding to the serving portion and a neighbor measure corresponding to the neighbor portion; and selecting the transmission frequency includes selecting the transmission frequency by comparing the serving measure and the neighbor measure.

15. The non-transitory computer readable medium as claimed in claim 14 further comprising:
calculating a serving ranking and a neighbor ranking based on the signal-interference measure; and wherein:
selecting the transmission frequency includes selecting the transmission frequency based on the serving ranking corresponding to the serving measure and the neighbor ranking corresponding to the neighbor measure.

16. The non-transitory computer readable medium as claimed in claim 14 further comprising:
determining an initial instance of a serving frequency;
determining an initialization limit for selecting the transmission frequency;

wherein:
generating the power analysis result includes generating the power analysis result including the serving measure for the signal-interference measure; and selecting the transmission frequency includes immediately selecting the transmission frequency based on the serving measure, the initial instance of the serving frequency, the initialization limit, or a combination thereof.

17. The non-transitory computer readable medium as claimed in claim 14 wherein:
generating the power analysis result includes generating the power analysis result including a primary signal power, a primary energy, a primary alternative power, an inter-frequency energy, or a combination thereof;

selecting the transmission frequency includes selecting the transmission frequency by initiating a signal-interference selection mechanism based on the primary signal power, the primary energy, the primary alternative power, the inter-frequency energy, or a combination thereof.

* * * * *